US009315619B2

(12) United States Patent
Hebig et al.

(10) Patent No.: US 9,315,619 B2
(45) Date of Patent: Apr. 19, 2016

(54) BINDING BISPHENOL A IN A POLYCARBONATE CONTAINER

(71) Applicant: International Business Machines Corporation, Armonk, NY (US)

(72) Inventors: Travis R. Hebig, Rochester, MN (US); Joseph Kuczynski, Rochester, MN (US); Robert E. Meyer, III, Rochester, MN (US); Steven R. Nickel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 13/753,115

(22) Filed: Jan. 29, 2013

(65) Prior Publication Data

US 2014/0210136 A1 Jul. 31, 2014

(51) Int. Cl.
*C08G 63/42* (2006.01)
*B29C 47/00* (2006.01)
*C08G 64/40* (2006.01)
*B29K 105/00* (2006.01)
*B29K 69/00* (2006.01)

(52) U.S. Cl.
CPC ............ *C08G 63/42* (2013.01); *B29C 47/0004* (2013.01); *C08G 64/406* (2013.01); *B29K 2069/00* (2013.01); *B29K 2105/0005* (2013.01)

(58) Field of Classification Search
CPC ............................. B29B 15/00; C08L 69/005
See application file for complete search history.

(56) References Cited

U.S. PATENT DOCUMENTS

| 5,717,057 | A  | * | 2/1998  | Sakashita et al. ............ 528/198 |
|-----------|----|---|---------|--------------------------------------|
| 6,307,005 | B1 |   | 10/2001 | Davis et al. |
| 6,486,294 | B1 | * | 11/2002 | Brack et al. .................. 528/198 |
| 6,747,119 | B2 |   | 6/2004  | Brack et al. |
| 7,144,632 | B2 |   | 12/2006 | Hayes |
| 2009/0130353 | A1 | * | 5/2009 | Pecorini et al. ............. 428/35.7 |
| 2012/0067763 | A1 |   | 3/2012 | Ozawa et al. |
| 2012/0070593 | A1 |   | 3/2012 | Carlson et al. |

OTHER PUBLICATIONS

Watabe et al., "Determination of bisphenol A in environmental water at ultra-low level by high-performance liquid chromatography with an effective on-line pretreatment device", Journal of Chromatography A, 1032 (2004) 45-49, © 2004 Elsevier B.V. DOI: 10.1016/j.chroma.2003.11.079.
Ichikawa et al., "Bisphenol A-imprinted polymer for environmental water purification", Kanagawa Institute of Technology, Faculty of Engineering, p. 37.

(Continued)

*Primary Examiner* — Alison L Hindenlang
(74) *Attorney, Agent, or Firm* — Scott A. Berger; Robert R. Williams

(57) ABSTRACT

Embodiments of the disclosure provide a method for removing residual BPA from a residual BPA-containing substance and a method for making a container with residual BPA removed. The method may consist of preparing a stabilization reagent, wherein water is removed from the stabilization reagent. The method may also include preparing the residual BPA-containing substance. The method may also include reacting the residual BPA-containing substance in a melt condensation process with the stabilization reagent, wherein the stabilization reagent is non-toxic.

19 Claims, 3 Drawing Sheets

(56) References Cited

OTHER PUBLICATIONS

Ikegami et al., "Synthetic polymers absorbing bisphenol a and its analogues prepared by covalent molecular imprinting using bisphenol A dimethacrylate as a template molecule", Analytical Bioanalytical Chem (2004) 378: 1898-1902, (Received 16 Sept 2003, Revised Dec. 7, 2003, Accepted Jan. 5, 2004, Published online Feb. 5, 2004), ©2004 Springer-Verlag, Berlin, Germany. DOI: 10.10071s00216-004-2490-8.

Kirk-Ottner Encyclopedia of Chemical Technology, "Dicarboxylic Acids", http://www.scribd.com/doc/30133508/ Dicarboxylic-Acids, uploaded Apr. 18, 2010. Copyright John Wiley & Sons, Inc. All rights reserved.

Kubo et al., "On-column concentration of bisphenol A with one-step removal of humic acids in water", Journal of Chromatography A, 987 (2003) 389-394, ©2002 Elsevier Science B.V.

Kubo et al., "Polymer-based absorption medium prepared using a fragment imprinting technique for homologues of chlorinated bisphenol A produced in the environment", Journal of Chromatography A, 1029 (2004) 37-41, (Received Oct. 30, 2003, Accepted Dec. 9, 2003), ©2004 Elsevier B.V. DOI: 10.1016/j.chroma.2003.12.050.

Takeda, K. and Kobayashi, T., "Bisphenol A imprinted polymer absorbents with selective recognition and binding characteristics", Science and Technology of Advanced Materials 6 (2005) 165-171, (Received Sep. 15, 2004, Revised Oct. 20, 2004, Accepted Nov. 24, 2004), ©2005 Elsevier Ltd. DOI: 10.1016/j.stam.2004.11.008.

Twaroski, M. "Acute and Repeated-Dose Toxicity of Bisphenol A", FAO/WHO Expert Meeting on Bishpenol A (BPA), Ottowa, Canada, Nov. 2-5, 2010. pp. 1-11. © World Health Organization 2011.

U.S. Food and Drug Administration, "Draft Assessment of Bisphenol A for Use in Food Contact Applications", Aug. 14, 2008, http://www.fda.gov/ohrms/dockets/AC/08/briefing/2008-0038b1_01_02_FDA%20BPA%20Draft%20Assessment.pdf.

Watabe et al., "Determination of bisphenol A in environmental water at ultra-low level by high-performance liquid chromatography with an effective on-line pretreatment device", Journal of Chromatography A, 1032 (2004) 45-49, ©2004 Elsevier B.V. DOI: 10.1016/j.chroma.2003.11.079.

\* cited by examiner

BINDING BISPHENOL A IN A POLYCARBONATE CONTAINER

TECHNICAL FIELD

Embodiments described herein generally relate to removing residual monomers in polycarbonate, specifically Bisphenol A (BPA).

BACKGROUND

Polycarbonates are tough, clear, and highly impact resistant thermoplastic resins. Polycarbonates have excellent properties for applications such as baby bottles and water bottles. Residual monomer, such as Bisphenol A (BPA), may leach out of the polycarbonate at certain temperatures and expose the consumer to the residual BPA. The residual BPA may disrupt the endocrine system of various mammalian species, including humans.

There are known methods of adding diacid residues into polycarbonate that concern altering the physical properties of the resulting polycarbonate, but not removal of residual BPA.

U.S. Pat. No. 6,747,119 discloses a method for preparing a polycarbonate by adding a free hydroxyl-containing polycarbonate to a mixture of an optionally substituted aromatic dihydroxy diacid and a symmetrically optionally activated aromatic carbonic acid diester.

U.S. Pat. No. 6,307,005 discloses a method of preparing a polyestercarbonate using an interfacial polymerization reaction using a diacid.

SUMMARY

Embodiments of the disclosure provide a method for removing residual BPA from a residual BPA-containing substance. The method may consist of preparing a stabilization reagent, wherein water is removed from the stabilization reagent. The method may also include preparing the residual BPA-containing substance. The method may also include reacting the residual BPA-containing substance in a melt condensation process with the stabilization reagent, wherein the stabilization reagent is non-toxic.

Another embodiment of the disclosure may provide a method of a container with stabilized residual BPA. The method may consist of preparing a stabilization reagent. The water is removed from the stabilization reagent. The method may also include preparing a residual BPA-containing substance. The method may also include reacting the residual BPA-containing substance in a melt condensation process with the stabilization reagent. The stabilization reagent is non-toxic. The method may also include making a container from the reaction product of the residual BPA-containing substance with the stabilization reagent.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

As mentioned above, the present disclosure relates to a method for removing residual monomer, specifically Bisphenol A (BPA). Diacids have been traditionally used to modify the physical properties of polycarbonates but not to reduce toxicity of polycarbonates. Even though the present disclosure focuses on removing BPA from polycarbonates, embodiments of the disclosure could apply to removing other types of unreacted monomers from polymers.

Embodiments of the disclosure have found that adding selected species of diacids and carboxylic acids, herein referred to as a stabilizing reagent, result in BPA binding with minimal leaching of the stabilizing reagent. This remains true even with a stoichiometric excess of stabilizing reagent.

Figure 1:
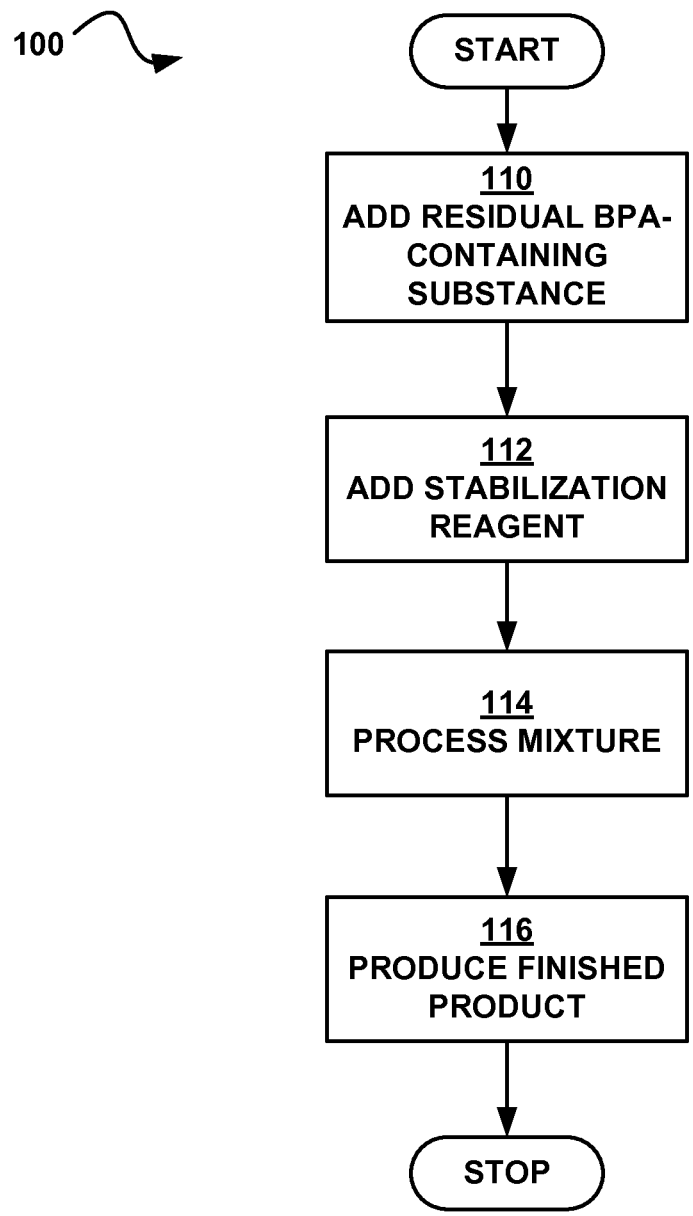
FIG. 1 illustrates an exemplary flowchart of a method of adding a stabilization reagent to a residual Bisphenol A (BPA)-containing substance, according to an embodiment.

FIG. 1 illustrates a flowchart of a method 100 of adding a stabilization reagent to a residual BPA-containing substance, according to an embodiment. The method may begin at operation 110. In operation 110, a residual BPA-containing substance is added to a hopper as a starting material. The hopper may refer to any holding container prior to a polymer melt reaction, but it could be any device. The residual BPA-containing substance may be any substance that contains residual BPA, e.g., BPA that is unbound by another molecule in a polymer. The residual BPA-containing substance may include a variety of different substances, e.g., epoxy resin, or, most notably, polycarbonate. The residual BPA-containing substance may be in a finished polymer state, e.g., polycarbonate recycling, or in a pelletized pre-melt state.

In operation 112, the stabilization reagent may be added to the residual BPA-containing substance. The stabilization reagent may be a reagent that reacts with BPA and represented by the following formula: $A_xD_yA_z$ where A is a carboxyl group or an ester, x is zero or an integer, D is a carbon chain that contains single, double, or triple bonds, y is an integer of the value 3, 5, or 6-33, y is an integer, z is an integer. If A is an ester, then the ether linkage may be of the formula O—R, where R contains a carbon chain of C1-C6 carbon atoms, which may be either single, double, or triple bonded, and O is oxygen.

The diacid or carboxylic acid must be non-toxic to humans and may be established by mg/kg in various mammalian species. An optimal selection of low toxicity diacid may have an acute dosage of greater than 6000 mg/kg for a mouse since a greater dosage threshold is required for acute toxic effects. Table 1 illustrates examples of possible diacid reactants with low toxicities.

TABLE 1

| Compound | Number of Carbon Atoms in Carbon Chain | Toxicity (Acute) Oral (mg/kg) | Species |
| --- | --- | --- | --- |
| Glutaric Acid | C3 | 6000 | Mouse |
| Dimethyl glutarate | C3 (ester) | 8191 | Rat |
| Pimelic Acid | C5 | 7000 | Rat |
| Azelaic Acid | C7 | >10000 | Rat |
| Dihexyl azelate | C7 (ester) | 16000 | Rat |
| Sebabic Acid | C8 | 6000 | Mouse |
| Dietyhl Sebacate | C8 (ester) | 14500 | Rat |
| Diacid 1550 | C21 | 6176 | Rat |
| Dodecanedioic Acid | C10 | 17000 | Rat |

Table 2 illustrates examples of possible carboxylic acid reactants. In some embodiments, the carboxylic acid moieties may be more favorable due to lower cost and prevalence in naturally occurring compounds, e.g., caprylic acid naturally occurs in goat milk fat.

TABLE 2

| Compound | Formula | Number of Carbon Atoms in Carbon Chain |
|---|---|---|
| Caprylic acid | $CH_3(CH_2)_6COOH$ | C7 |
| Pelargonic acid | $CH_3(CH_2)_7COOH$ | C8 |
| Capric acid | $CH_3(CH_2)_8COOH$ | C9 |
| Undecylic acid | $CH_3(CH_2)_9COOH$ | C10 |
| Lauric acid | $CH_3(CH_2)_{10}COOH$ | C11 |
| Tridecylic acid | $CH_3(CH_2)_{11}COOH$ | C12 |
| Myristic acid | $CH_3(CH_2)_{12}COOH$ | C13 |
| Pentadecanoic acid | $CH_3(CH_2)_{13}COOH$ | C14 |
| Palmitic acid | $CH_3(CH_2)_{14}COOH$ | C15 |
| Margaric acid | $CH_3(CH_2)_{15}COOH$ | C16 |
| Stearic acid | $CH_3(CH_2)_{16}COOH$ | C17 |
| Arachidic acid | $CH_3(CH_2)_{18}COOH$ | C19 |

The stabilization reagent may be in a water-free solvent. The water-free solvent may be selected so that it does not interact with the residual BPA-containing substance or the polymer formed from the reaction of the stabilization reagent and the residual BPA-containing substance. Other processes may be introduced to ensure that the stabilization reagent is free of water. For example, the stabilization reagent may be subjected to a drying operation. A drying operation may include preheating the stabilization reagent or pretreating with a desiccant that may be removed such as calcium sulfate, calcium chloride, or activated charcoal. In one embodiment, the preheating process may occur at a temperature that is above 100 C but below the glass transition temperature of the residual BPA-containing substance. In another embodiment, the preheating process may occur at any temperature below the degradation temperature of the stabilization reagent.

The stabilization reagent may be added in a particular proportion depending on the amount of residual BPA predicted to be in the substance. For example, in polycarbonate, the BPA concentration may range from 7 mg/kg to 50 mg/kg and the polycarbonate may range in molecular weight from 10,000 g/mol to 200,000 g/mol. Therefore the mol % of stabilization reagent needed may be anywhere from 0.03 mol %-4.38 mol %. These values may be quickly determined by those with ordinary skill in the art. In another embodiment, there may be a stoichiometric excess of stabilization reagent added. For example, using the previous example, the mol % of stabilization reagent to be added may be 10 mol %.

In operation 114, the stabilization reagent and the residual BPA-containing substance may be reacted together in a melt condensation process. A melt condensation process may be a reaction that occurs between two monomers at an elevated temperature and produces water as a byproduct. The reaction between the residual BPA-containing substance and the stabilization reagent may occur during the melt phase, when the residual BPA-containing substance is converted to a molten state. The molten state is achieved by slowly elevating the temperature of the residual BPA-containing substance at or beyond the glass transition temperature of the substance. For example, if the glass transition temperature of polycarbonate is 147 C to 155 C, then the temperature may be first elevated to 147 C and then slowly increased to 155 C. The reaction may occur best at a reaction temperature range of 250 C to 350 C. In an embodiment, the residual BPA-containing substance may be melted in operation 110 before the addition of the stabilization reagent. In another embodiment, the residual BPA-containing substance and stabilization reagent are combined together before the melt phase, and then gradually heated to the reaction temperature.

The reaction may occur in the absence or presence of a catalyst. An example of a catalyst may include tetramethylammonium hydroxide (TTMH) in a molar ratio of less than 1 mole TTMH to 1 mole stabilization reagent. The catalyst may be added during the melt phase in operation 114 or any time before the melt phase. The catalyst may also be premixed with the stabilization reagent in operation 112.

The reaction may ideally occur at atmospheric pressure although it may be possible in some embodiments to conduct the reaction under higher than atmospheric pressure.

Additionally, any variety of plasticizers may be added during the melt phase of the reaction. The plasticizer may modify the underlying physical properties of the polymer. Ideally, plasticizers should be selected based on their ability to not leech out of the polymer or selected based on low-toxicity.

In operation 116, the melted polymer may be cooled and processed into a variety of polymer products, e.g., baby bottles, food storage containers, or water bottles. The processing may occur in a variety of different ways including blow molds, and extrusion.

Figure 2:
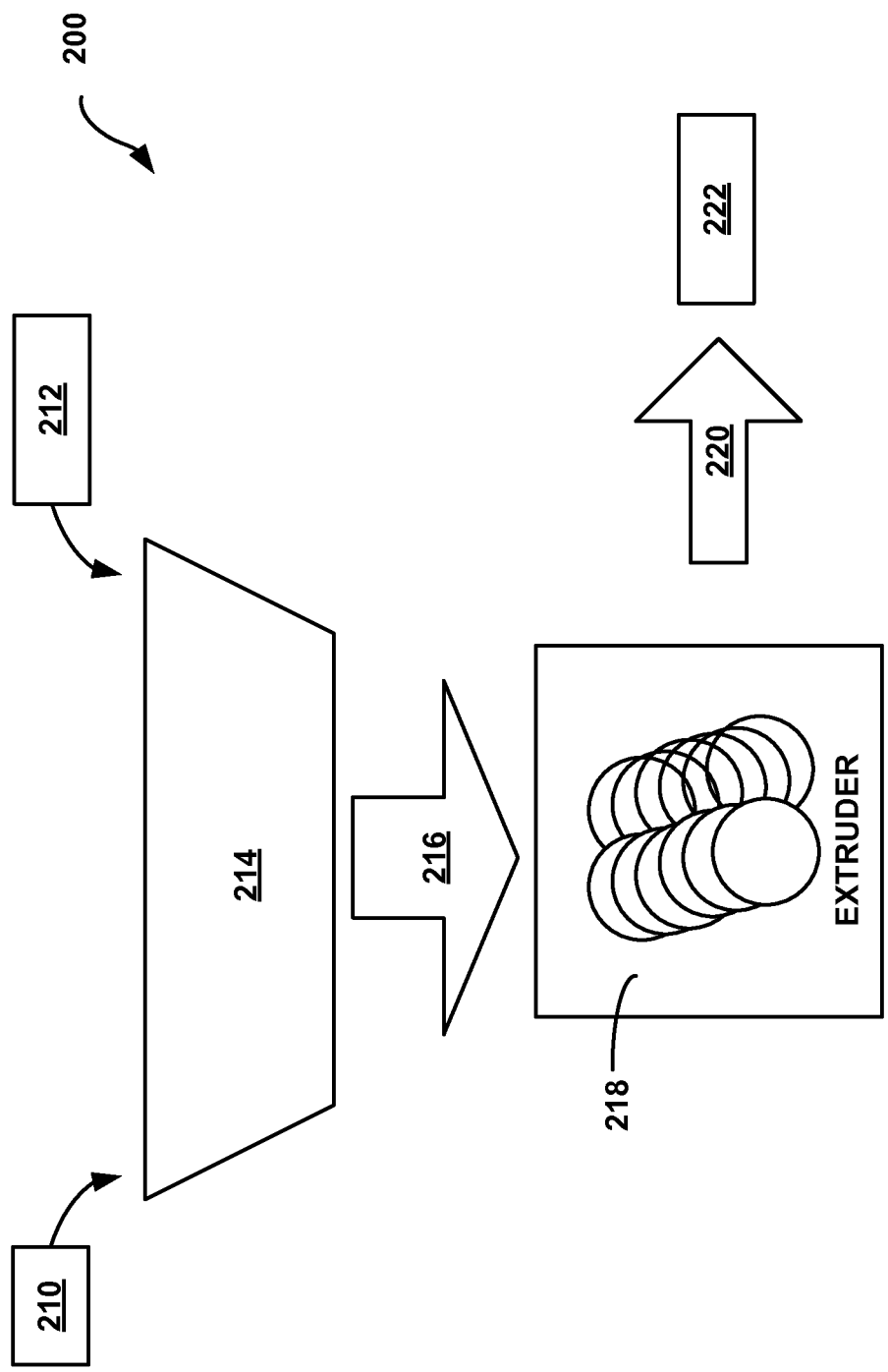
FIG. 2 illustrates an exemplary configuration of an apparatus for adding a stabilization reagent to a residual BPA-containing substance, according to an embodiment.

FIG. 2 depicts an example of an apparatus 200 that may be used to implement the reaction, according to an embodiment. The apparatus 200 may receive a residual BPA-containing substance 210, and a stabilization reagent 212. The receipt of the residual BPA-containing substance 210 may correspond to operation 110. The receipt of the stabilization reagent 212 may correspond to operation 112.

The residual BPA-containing substance 210 and the stabilization reagent 212 may be received into a hopper 214. The function of the hopper 214 may be blending the residual BPA-containing substance 210 and the stabilization reagent 212 before the melt phase, according to an embodiment. In an embodiment, after blending in a hopper 214, the residual BPA-containing substance 210 and the stabilization reagent 212 may be reacted in a melt reaction 216. The melt reaction 216 may correspond to operation 114. An example of a reaction where BPA is stabilized is shown on FIG. 3. As an example of further processing, the melt reaction 216 may proceed to an extruder 218. In an embodiment, the extruder 218 may take the melted product from the reaction of the residual BPA-containing substance 210 and the stabilization reagent 212 and further blend the resulting product. The extruder 218 may then under go a finishing process 220 that corresponds to operation 116 to produce a final product 222. Examples of final products include baby bottles, water bottles, and food containers.

Figure 3:
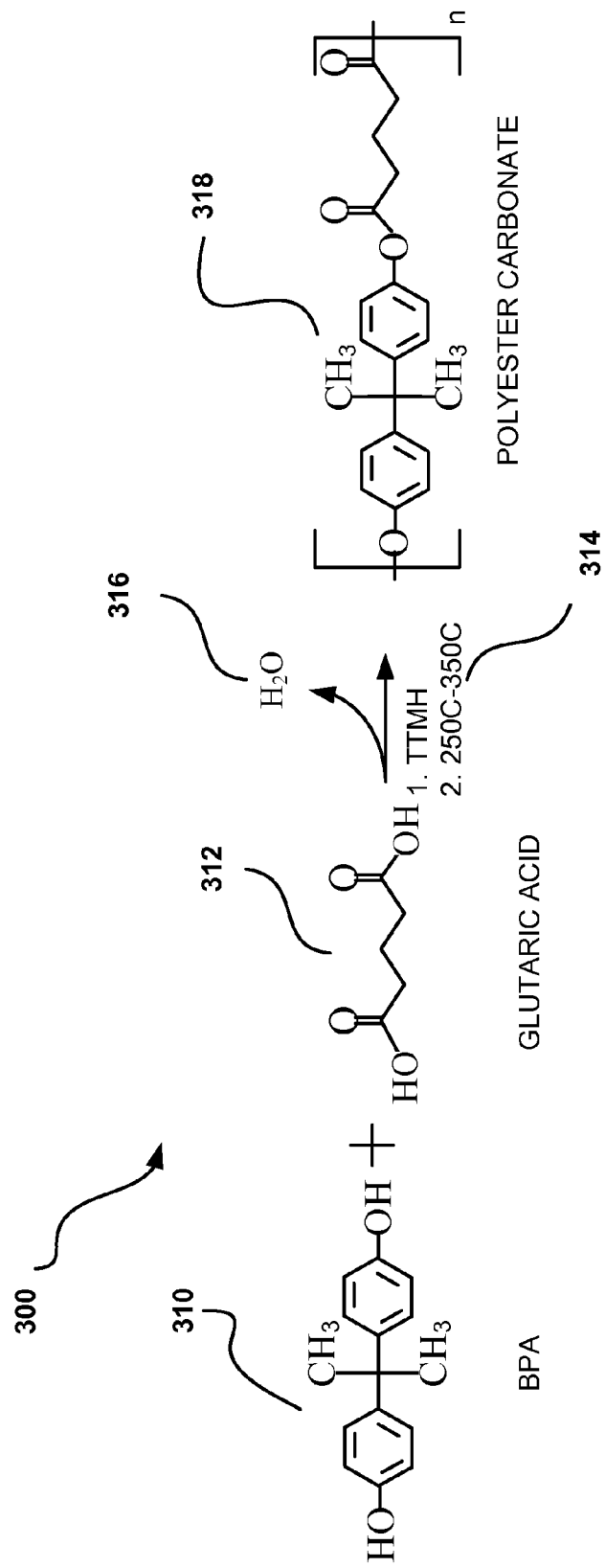
FIG. 3 is a representation of the reaction between BPA and glutaric acid to remove residual BPA, according to an embodiment.

FIG. 3 illustrates an example of the melt condensation reaction 300 that stabilizes BPA 310 in a residual BPA-containing substance, according to an embodiment. In the example, the residual BPA 310 in the substance is reacted with glutaric acid 312, a species of diacid, in order to bind the residual BPA in the substance. The reaction may occur with or without a catalyst 316. In the shown example, TTMH is used but other configurations are contemplated. The reaction 300 may occur in a temperature range of 250 C-350 C. In some embodiments, the temperature range may depend on the typical processing conditions of various grades of the residual BPA-containing substance 210, e.g. polycarbonate. The temperature range may be narrowed based on an empirical determination of the specific residual BPA-containing substance 210 used in the reaction.

The reaction 300 produces water 316. The water may be removed using standard polymer processing methods. After the BPA 310 and glutaric acid 312 react at elevated temperature conditions 314, a form of polyester carbonate 318 is produced. The polyester carbonate 318 stabilizes any leftover BPA in the residual BPA-containing substance.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope and spirit of the disclosed subject matter.

What is claimed is:

1. A method of removing residual BPA from a residual BPA-containing substance, consisting of:
    preparing a stabilization reagent that reacts with BPA, the stabilization reagent is non-toxic and a compound of the general formula:
    $A_xD_yA_z$ where A is a carboxyl group or an ester, x is zero or an integer, D is a carbon chain, y is an integer of the value 3, 5, or 6-33, z is an integer;
    removing water from the stabilization reagent by a drying operation, the drying operation includes preheating the stabilization reagent, the preheating occurs at a temperature above 100 C and below the glass transition temperature of the residual BPA-containing substance;
    preparing the residual BPA-containing substance; and
    reacting the residual BPA-containing substance in a melt condensation process with the stabilization reagent.
2. The method of claim 1, wherein the residual BPA-containing substance is a polycarbonate.
3. The method of claim 2, wherein the stabilization reagent comprises 0.03-4.38 mol % of the polycarbonate prior to the reacting.
4. The method of claim 1, wherein the reacting occurs at a temperature of 250-350° C.
5. The method of claim 1, wherein the reacting occurs with a catalyst.
6. The method of claim 5, wherein the catalyst is TTMH.
7. The method of claim 1, wherein the stabilization reagent includes caprylic acid.
8. The method of claim 1, wherein the stabilization reagent includes azelaic acid.
9. The method of claim 1, wherein the ester is the stabilization reagent is a compound of the formula O—R, where R contains a carbon chain of C1-C6 and O is oxygen.
10. The method of claim 9, wherein the stabilization reagent includes dimethyl glutarate.
11. The method of claim 1, further comprising: making a container from a reaction product of the residual BPA-containing substance with the stabilization reagent.
12. The method of claim 11, wherein the making the container occurs through injection molding.
13. The method of claim 1, wherein non-toxic is an acute dosage of greater than 6000 mg/kg for a mouse.
14. The method of claim 1, wherein the preparing a stabilization reagent includes adding a stoichiometric excess of 10 mol % of the stabilization reagent prior to the reacting.
15. The method of claim 1, wherein the reacting occurs before the melt phase of the BPA-containing substance.
16. The method of claim 1, wherein the stabilization reagent includes pelargonic acid.
17. The method of claim 1, wherein the removing water includes pretreating the stabilization reagent with a desiccant.
18. The method of claim 17, further comprising removing the desiccant from the stabilization reagent.
19. The method of claim 1, wherein the stabilization is of a single monomer type.

\* \* \* \* \*